(12) United States Patent
Kray et al.

(10) Patent No.: US 12,331,657 B2
(45) Date of Patent: Jun. 17, 2025

(54) COMPOSITE AIRFOIL FOR A TURBINE ENGINE

(71) Applicant: GENERAL ELECTRIC COMPANY, Schenectady, NY (US)

(72) Inventors: Nicholas Joseph Kray, Mason, OH (US); Elzbieta Kryj-Kos, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 3 days.

(21) Appl. No.: 18/314,499

(22) Filed: May 9, 2023

(65) Prior Publication Data

US 2024/0376828 A1    Nov. 14, 2024

(51) Int. Cl.
    *F01D 5/28*    (2006.01)

(52) U.S. Cl.
    CPC ...... *F01D 5/282* (2013.01); *F05B 2280/6003* (2013.01)

(58) Field of Classification Search
    CPC .............................. F01D 5/282; F01D 5/147
    See application file for complete search history.

(56) References Cited

U.S. PATENT DOCUMENTS

| | | | |
|---|---|---|---|
| 3,011,760 A | 12/1961 | Eckert | |
| 6,328,531 B1 | 12/2001 | Bariaud et al. | |
| 7,431,197 B2 | 10/2008 | Franchet et al. | |
| 7,435,058 B2 * | 10/2008 | Campbell | F01D 5/284 416/232 |
| 7,815,417 B2 * | 10/2010 | Somanath | F01D 5/147 416/232 |
| 8,105,042 B2 | 1/2012 | Parkin et al. | |
| 8,419,374 B2 | 4/2013 | Huth et al. | |
| 8,696,319 B2 | 4/2014 | Naik | |
| 9,162,750 B2 | 10/2015 | Coupe et al. | |
| 9,657,577 B2 | 5/2017 | Weisse | |
| 9,957,972 B2 | 5/2018 | Foster | |
| 10,371,165 B2 | 8/2019 | Weisse et al. | |
| 2012/0034091 A1 | 2/2012 | Goldfinch et al. | |
| 2014/0112796 A1 * | 4/2014 | Kray | F04D 29/324 416/226 |
| 2018/0320706 A1 * | 11/2018 | Jain | B32B 5/12 |
| 2023/0010778 A1 * | 1/2023 | Coutier | F01D 5/282 |

FOREIGN PATENT DOCUMENTS

| | | |
|---|---|---|
| FR | 3034131 | 9/2016 |
| FR | 3105291 A1 | 6/2021 |
| WO | WO2015034630 A1 | 3/2015 |

* cited by examiner

Primary Examiner — Michael L Sehn
(74) Attorney, Agent, or Firm — McGarry Bair PC

(57) ABSTRACT

A composite airfoil with an airfoil core and a wall surrounding the airfoil core. The wall including a first set of stacked plies including a first type of ply having directional fibers extending in a first direction, and defining at least a portion of an exterior surface, the exterior surface extending between a leading edge and a trailing edge to define a chordwise direction and between a root and a tip to define a spanwise direction. At least one stiffener located between the airfoil core and the wall, the at least one stiffener having a second set of stacked plies.

20 Claims, 7 Drawing Sheets

COMPOSITE AIRFOIL FOR A TURBINE ENGINE

TECHNICAL FIELD

The disclosure generally relates to a component for a turbine engine, more specifically, to a composite airfoil.

BACKGROUND

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
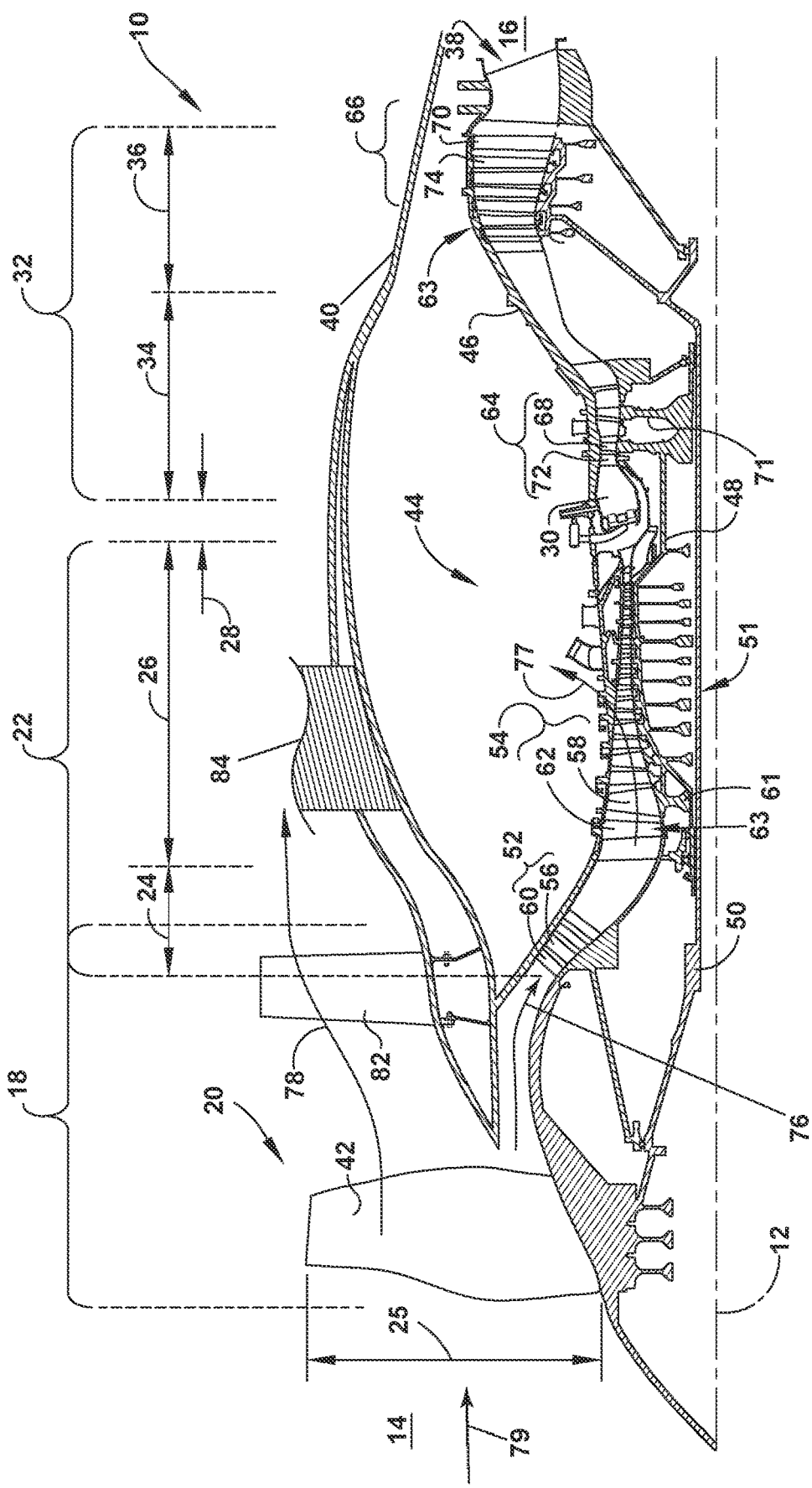
FIG. 1 is a schematic cross-sectional view of an unducted or open rotor turbine engine.

Traditionally, composite airfoils include woven pre-forms that only consist of radial and axial fibers (i.e. spanwise and chordwise). These fibers are oriented at 90 degrees with respect to each other. These types of orientations can provide difficulty to invoking torsional stiffness to the composite airfoil other than via the composite skin.

Aspects of the disclosure herein are directed to a component for a turbine engine having a composite airfoil with at least one stiffener located between a composite skin and an airfoil core of the composite airfoil. The at least one stiffener can be shaped to be received in a portion of the either the composite skin or the airfoil core.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The term "composite," as used herein is, is indicative of a component having two or more materials. A composite can be a combination of at least two or more metal, non-metallic, or a combination of metal and non-metallic elements or materials. Examples of a composite material can be, but not limited to, a polymer matrix composite (PMC), a ceramic matrix composite (CMC), metal matrix composite (MMC), carbon fiber, polymeric resin, thermoplastic, bismaleimide (BMI), polyimide materials, epoxy resin, glass fiber, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example, electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing, to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first" and "second" may be used interchangeably to distinguish one component from another and are not intended to signify location or importance of the individual components.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, with regard to a gas turbine engine, forward refers to a position closer to an engine inlet and aft refers to a position closer to an engine nozzle or exhaust.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In certain aspects of the present disclosure, an unducted or open rotor turbine engine includes a set of circumferentially spaced fan blades, which extend, exteriorly, beyond a nacelle encasing an engine core.

FIG. 1 is a schematic cross-sectional diagram of a turbine engine, specifically an open rotor or unducted turbine engine 10 for an aircraft. The unducted turbine engine 10 has a generally longitudinally extending axis or engine centerline 12 extending from a forward end 14 to an aft end 16. The unducted turbine engine 10 includes, in downstream serial flow relationship, a set of circumferentially spaced blades or propellers defining a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38. The unducted turbine engine 10 as described herein is meant as a non-limiting example, and other architectures are possible, such as, but not limited to, a steam turbine engine, a supercritical carbon dioxide turbine engine, or any other suitable turbine engine.

An exterior surface, defined by a housing or nacelle 40, of the unducted turbine engine 10 extends from the forward end 14 of the unducted turbine engine 10 toward the aft end 16 of the unducted turbine engine 10 and covers at least a portion of the compressor section 22, the combustion section 28, the turbine section 32, and the exhaust section 38. The fan section 18 can be positioned at a forward portion of the nacelle 40 and extend radially outward from the nacelle 40 of the unducted turbine engine 10, specifically, the fan section 18 extends radially outward from the nacelle 40. The fan section 18 includes a set of fan blades 42, and a set of stationary fan vanes 82 downstream the set of fan blades 42, both disposed radially from and circumferentially about the engine centerline 12. The unducted turbine engine 10 includes any number of one or more sets of rotating blades or propellers (e.g., the set of fan blades 42) disposed upstream of the set of stationary fan vanes 82. As a non-limiting example, the unducted turbine engine 10 can include multiple sets of fan blades 42 or fan vanes 82. As such, the unducted turbine engine 10 is further defined as an unducted single-fan turbine engine. The unducted turbine engine 10 is further defined by the location of the fan section 18 with respect to the combustion section 28. The fan section 18 can be upstream, downstream, or in-line with the axial positioning of the combustion section 28.

The compressor section 22, the combustion section 28, and the turbine section 32 are collectively referred to as an engine core 44, which generates combustion gases. The engine core 44 is surrounded by an engine casing 46, which is operatively coupled with a portion of the nacelle 40 of the unducted turbine engine 10.

An HP shaft or spool 48 disposed coaxially about the engine centerline 12 of the unducted turbine engine 10 drivingly connects the HP turbine 34 to the HP compressor 26. An LP shaft or spool 50, which is disposed coaxially about the engine centerline 12 of the unducted turbine engine 10 within the larger diameter annular HP spool 48, drivingly connects the LP turbine 36 to the LP compressor 24 and fan 20. The spools 48, 50 are rotatable about the engine centerline 12 and coupled to a set of rotatable elements, which collectively define a rotor 51.

It will be appreciated that the unducted turbine engine 10 is either a direct drive or integral drive engine utilizing a reduction gearbox coupling the LP shaft or spool 50 to the fan 20.

The LP compressor 24 and the HP compressor 26, respectively, include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 are provided in a ring and extend radially outwardly relative to the engine centerline 12, from a blade platform to a blade tip, while the corresponding static compressor vanes 60, 62 are positioned upstream of and adjacent to the compressor blades 56, 58. It is noted that the number of blades, vanes, and compressor stages shown in FIG. 1 were selected for illustrative purposes only, and that other numbers are possible.

The compressor blades 56, 58 for a stage of the compressor section 22 are mounted to a disk 61, which is mounted to the corresponding one of the HP and LP spools 48, 50, with each stage having its own disk 61. The static compressor vanes 60, 62 for a stage of the compressor section 22 are mounted to the engine casing 46 in a circumferential arrangement.

The HP turbine 34 and the LP turbine 36, respectively, include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 are provided in a ring and extends radially outwardly relative to the engine centerline 12, from a blade platform to a blade tip, while the corresponding static turbine vanes 72, 74 are positioned upstream of and adjacent to the turbine blades 68, 70. It is noted that the number of blades, vanes, and turbine stages shown in FIG. 1 were selected for illustrative purposes only, and that other numbers are possible.

The turbine blades 68, 70 for a stage of the turbine section 32 are mounted to a disk 71, which is mounted to the corresponding one of the HP and LP spools 48, 50, with each stage having a dedicated disk 71. The static turbine vanes 72, 74 for a stage of the turbine section 32 are mounted to the engine casing 46 in a circumferential arrangement.

Rotary portions of the unducted turbine engine 10, such as the blades 56, 58 68, 70 among the compressor section 22 and the turbine section 32 are also referred to individually or collectively as the rotor 51. As such, the rotor 51 refers to the combination of rotating elements throughout the unducted turbine engine 10.

Complementary to the rotary portions, the stationary portions of the unducted turbine engine 10, such as the static vanes 60, 62, 72, 74 among the compressor section 22 and the turbine section 32 are also referred to individually or collectively as a stator 63. As such, the stator 63 refers to the combination of non-rotating elements throughout the unducted turbine engine 10.

The nacelle 40 is operatively coupled to the unducted turbine engine 10 and covers at least a portion of the engine core 44, the engine casing 46, or the exhaust section 38. At least a portion of the nacelle 40 extends axially forward or upstream the illustrated position. For example, the nacelle 40 extends axially forward such that a portion of the nacelle 40 overlays or covers a portion of the fan section 18 or a booster section (not illustrated) of the unducted turbine engine 10.

During operation of the unducted turbine engine 10, a freestream airflow 79 flows against a forward portion of the unducted turbine engine 10. A portion of the freestream airflow 79 enters an annular area 25 defined by a swept area between an outer surface of the nacelle 40 and the tip of the fan blade 42, with this air flow being an inlet airflow 78. A portion of the inlet airflow 78 enters the engine core 44 and is described as a working airflow 76, which is used for combustion within the engine core 44.

More specifically, the working airflow 76 flows into the LP compressor 24, which then pressurizes the working airflow 76 thus defining a pressurized airflow that is supplied to the HP compressor 26, which further pressurizes the air. The working airflow 76, or the pressurized airflow, from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the working airflow 76, or exhaust gas, is ultimately discharged from the unducted turbine engine 10 via the exhaust section 38. The driving of the LP turbine 36 drives the LP spool 50 to rotate the fan 20 and the LP compressor 24. The working airflow 76, including the pressurized airflow and the combustion gases, defines a working airflow that flows through the compressor section 22, the combustion section 28, and the turbine section 32 of the unducted turbine engine 10.

The inlet airflow 78 flows through the set of fan blades 42, over at least a portion of the set of stationary fan vanes 82, and the nacelle 40 of the unducted turbine engine 10. The inlet airflow 78 then flows past the set of stationary fan vanes 82, following the curvature of the nacelle 40 and toward the exhaust section 38. A pylon 84 mounts the unducted turbine engine 10 to an exterior structure (e.g., a fuselage of an aircraft, a wing, a tail wing, etc.).

The working airflow 76 and at least some of the inlet airflow 78 merge downstream of the exhaust section 38 of the unducted turbine engine 10. The working airflow 76 and the inlet airflow 78, together, form an overall thrust of the unducted turbine engine 10.

It is contemplated that a portion of the working airflow 76 is drawn as bleed air 77 (e.g., from the compressor section 22). The bleed air 77 provides an airflow to engine components requiring cooling. The temperature of the working airflow 76 exiting the combustor 30 is significantly increased with respect to the working airflow 76 within the compressor section 22. As such, cooling provided by the bleed air 77 is necessary for operating of such engine components in heightened temperature environments or a hot portion of the unducted turbine engine 10. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid are, but are not limited to, fluid discharged from the LP compressor 24 or the HP compressor 26.

Figure 2:
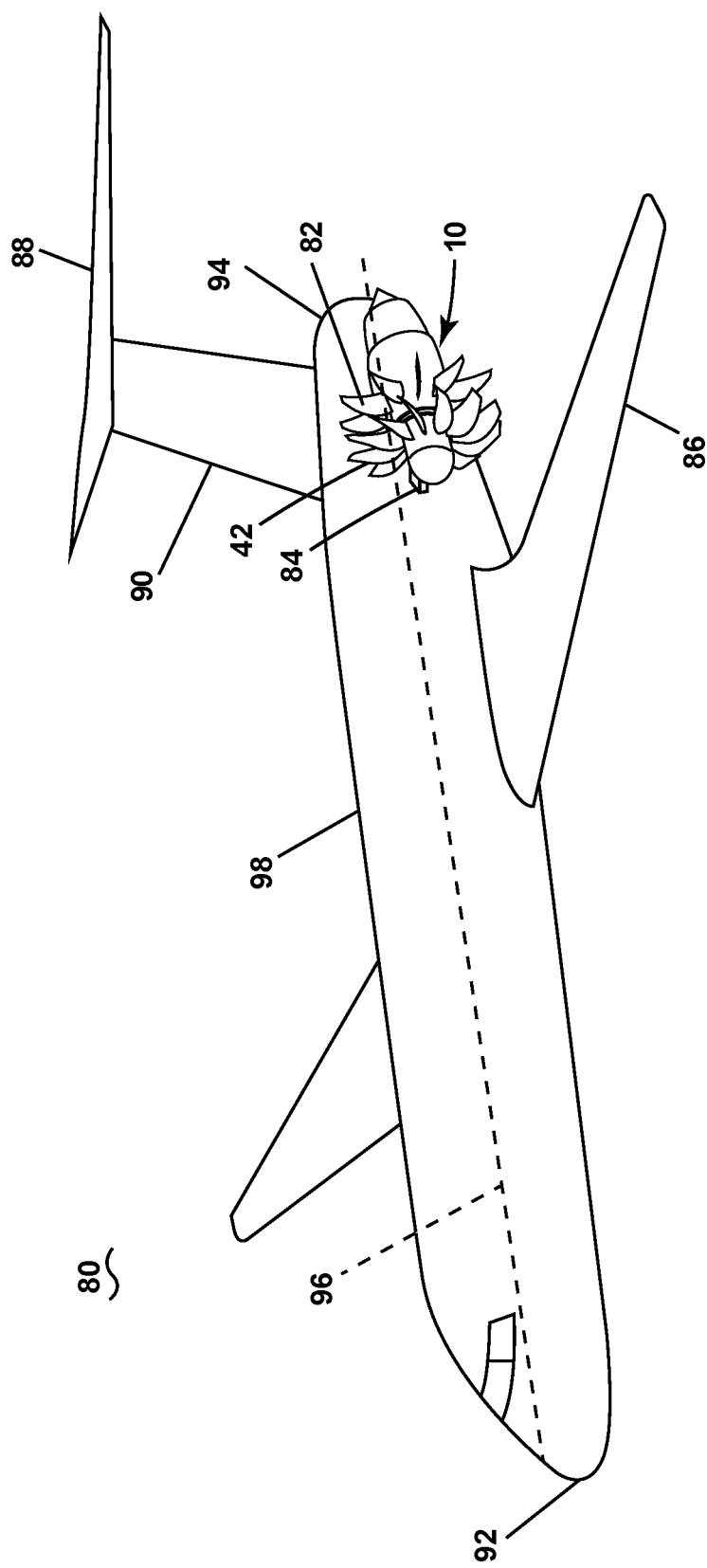
FIG. 2 is a schematic perspective view of an aircraft including the unducted or open rotor turbine engine of FIG. 1.

FIG. 2 is a schematic perspective view of an aircraft 80 including a generic unducted turbine engine, by way of non-limiting example, the unducted turbine engine 10 of FIG. 1. The aircraft 80 includes a fuselage 98 with an exterior surface. At least one wing 86 and a tail wing 88 extend from the fuselage 98. The tail wing 88 is operably coupled to and spaced from the fuselage 98 via a tail wing pylon 90. The unducted turbine engine 10 is operably coupled to the exterior surface of the fuselage 98 via the pylon 84. The unducted turbine engine 10 includes the set of fan blades 42. The set of stationary fan vanes 82 is provided downstream of the set of fan blades 42. The fuselage 98 extends between a nose 92 and a tail 94 and includes a fuselage centerline 96 extending therebetween.

Additionally, while the tail wing 88 is illustrated as a T-wing tail wing, other conventional tail wings are contemplated such as, a cruciform tail wing, an H-tail, a triple tail, a V-tail, an inverted tail, a Y-tail, a twin-tail, a boom-mounted tail, or a ring tail, all of which are referred to herein as the tail wing 88.

Figure 3:
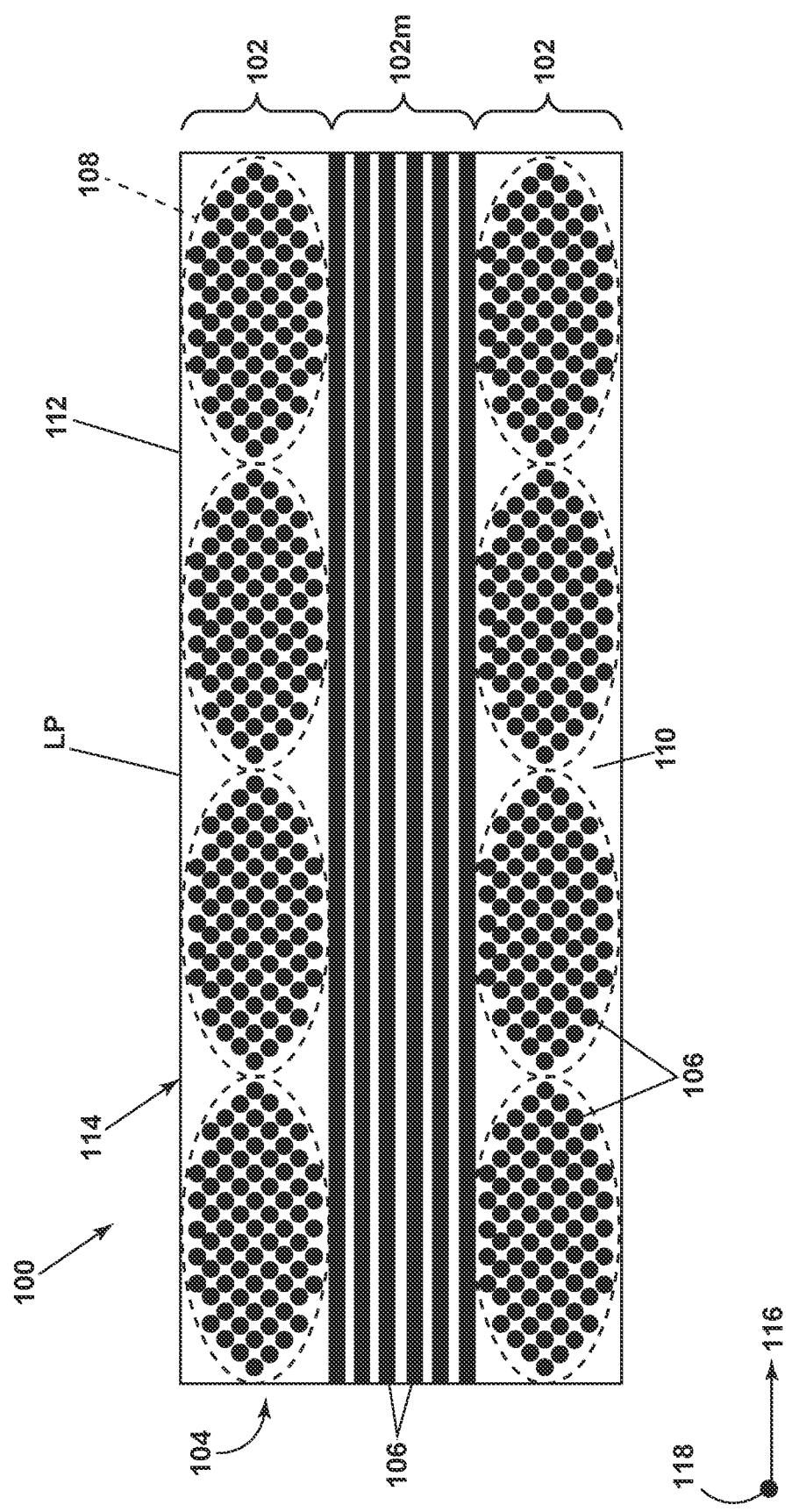
FIG. 3 is a schematic cross-sectional view of a component including multiple plies.

FIG. 3 is a schematic cross-sectional view of a component 100 including multiple plies 102. The component 100 can be formed of a composite material, by way of non-limiting example a CMC material, where manufacturing the component 100 entails stacking and debulking multiple plies 102 to form a laminate 114, a process referred to as "lay-up." Each ply 102 contains a ceramic reinforcement made up of multiple fibers 106 bundled into individual tows 108 and encased in a ceramic matrix 110. The ceramic matrix 110 is formed by conversion, by way of non-limiting example with firing, of a ceramic matrix precursor as a binder used to impregnate the tows 108. In one non-limiting process, a matrix slurry can be utilized to impregnate tows 108 where a set of tows 112 can define a prepreg 104 usually in the form of a ply or sheet. The multiple fibers 106 can be unidirectionally aligned such that a single layer of ply 102 can include the set of tows 112 aligned and impregnated with the matrix precursor and arranged unidirectionally. For example, a middle ply 102*m* includes fibers 106 extending along a first direction 116, across the page, and fibers 106 in the plies 102 bordering the middle ply 102*m* extend in a second direction 118, into the page. The first and second directions 116, 118 can be perpendicular to each other. It should be understood that while described with reference to a CMC material, the composite can be any of the materials described herein with regards to a component having two or more materials, including PMC and MMC among other materials.

The prepregs 104 are typically, but not necessarily, arranged so that tows 108 of adjacent prepregs 104 are oriented transverse to each other, providing greater strength in a laminar plane (denoted "LP") of the laminate 114 (corresponding to the principal (load-bearing) directions of the final CMC component). However, the prepregs 104 may be arranged in other ways as well, e.g., tows of one or more adjacent prepregs may not be oriented transverse or perpendicular to each other but, in various embodiments, may be parallel to each other, offset from each other less than 90 degrees, etc. A stack of prepregs may include adjacent prepregs having a variety of tow orientations with respect to each other.

Figure 4:
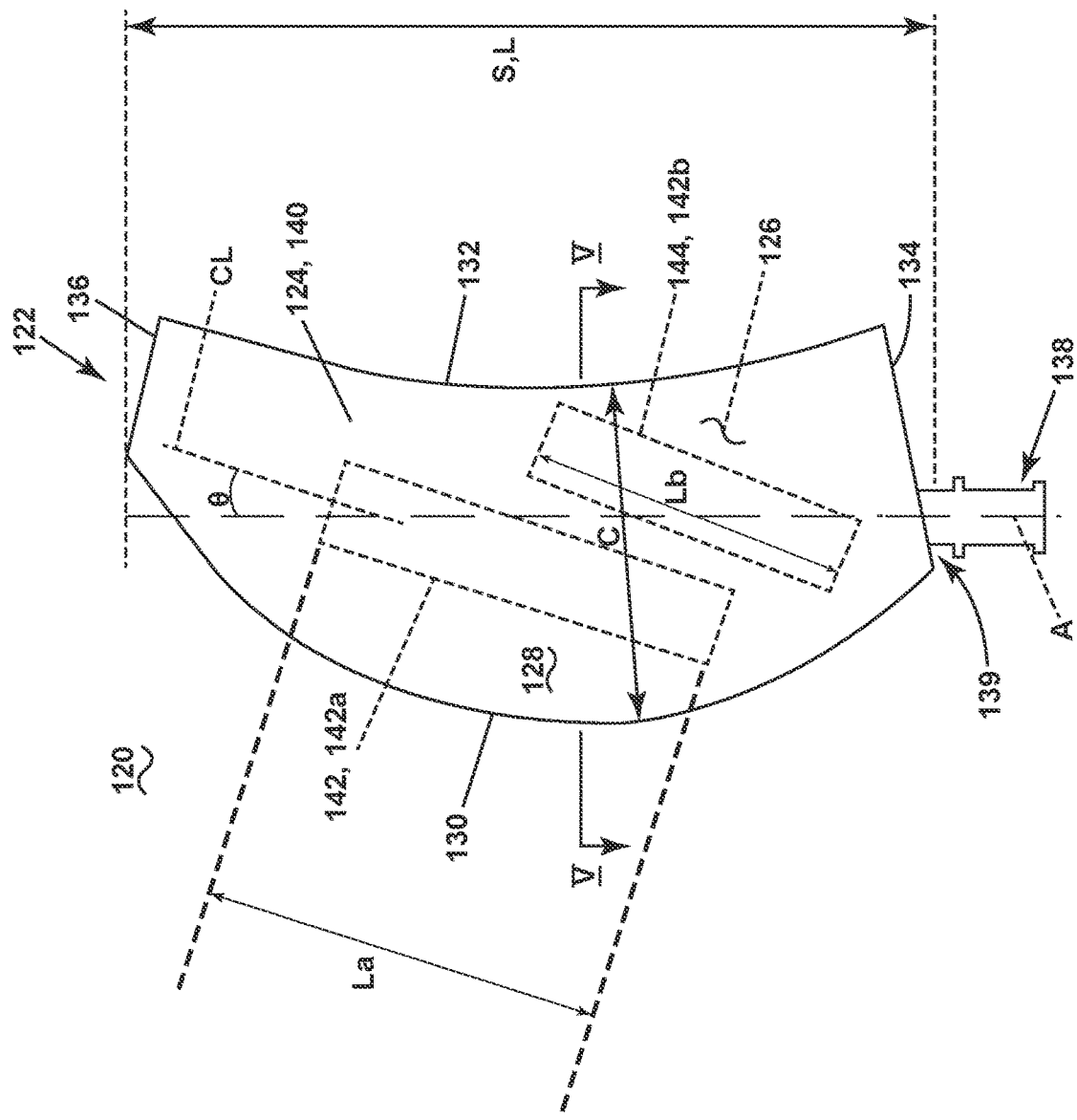
FIG. 4 is schematic illustration of an engine component in the form of an airfoil with a stiffener according to an aspect of the disclosure herein.

FIG. 4 is schematic illustration of an engine component in the form of an airfoil 120. The airfoil 120 includes an airfoil in the form of a composite airfoil 122. The composite airfoil 122 can be, by way of non-limiting example, a blade of the set of fan blades 42 or a blade from the compressor blades 56, 58 or the turbine blades 68, 70. Further, the airfoil 120 can be a vane assembly, where the composite airfoil 122 is a vane of the set of stationary fan vanes 82 or a vane of the static vanes 60, 62, 72, 74. It is contemplated that the composite airfoil 122 can be a blade, vane, airfoil, or other component of any turbine engine, such as, but not limited to, a gas turbine engine, a turboprop engine, a turboshaft engine, or a turbofan engine.

The composite airfoil 122 includes a wall 124 bounding an interior 126. The wall 124 defines an exterior surface 128 extending between a leading edge 130 and a trailing edge 132 to define a chordwise direction (denoted "C"). The exterior surface 128 can further extend between a root 134 and a tip 136 to define a spanwise direction (denoted "S").

The composite airfoil 122 can be mounted to the rotor 51 (FIG. 1) via a spar assembly 138. The composite airfoil 122 can be mounted to the spar assembly 138 near the root 134 to define a hub 139. The spar assembly 138 defines an axis A extending radially from and perpendicular to the engine centerline 12 (FIG. 1). The composite airfoil 122 has a span length (denoted "L") measured along the spanwise direction S from the hub 139 at 0% the span length L to the tip 136 at 100% the span length L. The span length L can run parallel to the axis A and be defined as the maximum distance between the root 134 and the tip 136 of the composite airfoil 122.

By way of non-limiting example, the wall 124 can be formed from at least one laminate skin 140 formed from laminate 114 as described in FIG. 3. The wall 124 can be formed from one or more layers of plies 102 (FIG. 3). The one or more layers of plies 102 can be applied during the same stage or different stages of the manufacturing of the composite airfoil 122.

At least one stiffener 142 can be located within the interior 126. The at least one stiffener 142 can define a stiffener centerline (denoted "CL"). The stiffener centerline CL can be oriented at a stiffener angle (denoted "θ") with respect to the axis A. The stiffener angle θ can be equal to or between 30 degrees and 60 degrees ($30° \leq \theta \leq 60°$). The stiffener angle θ is determined based on the working environment in which the composite airfoil 122 will be located and in turn on the torsional forces that the composite airfoil 122 will undergo. In other words, the at least one stiffener 142 is oriented so as to provide torsional stiffening for the entire composite airfoil 122 during operation. The at least one stiffener 142 can be multiple stiffeners, illustrated as a first stiffener 142a and a second stiffener 142b. Each of the multiple stiffeners 142a, 142b can be oriented at the same stiffener angle θ, or different stiffener angles θ as illustrated based on their respective locations within the composite airfoil 122. The first stiffener 142a can have a first stiffener length (denoted "La") and the second stiffener 142b can have a second stiffener length (denoted "Lb") different than the first stiffener length La. It is also contemplated that the first and second stiffener lengths La, Lb are equal.

The at least one stiffener 142 can be a laminate stiffener 144 formed from laminate 114 as described in FIG. 3. The at least one stiffener 142 can be formed from one or more layers of plies 102 (FIG. 3). The one or more layers of plies 102 can be applied during the same stage or different stages of the manufacturing of the composite airfoil 122.

It is also contemplated that one or more layers of adhesive (not shown) can be applied between the wall 124, the at least one stiffener 142, and any portion of the spar assembly 138. Further, it is contemplated that the adhesive can be at least partially absorbed by the wall 124, the at least one stiffener 142, and one or more portions of the spar assembly 138. The adhesive can include resin and phenolics, wherein the adhesive can require curing at elevated temperatures or other hardening technique. Any part of the spar assembly 138 can be located in the interior 126 or along the exterior surface 128, or both in the interior 126 and along the exterior surface 128 and bonded at those locations accordingly.

Figure 5:
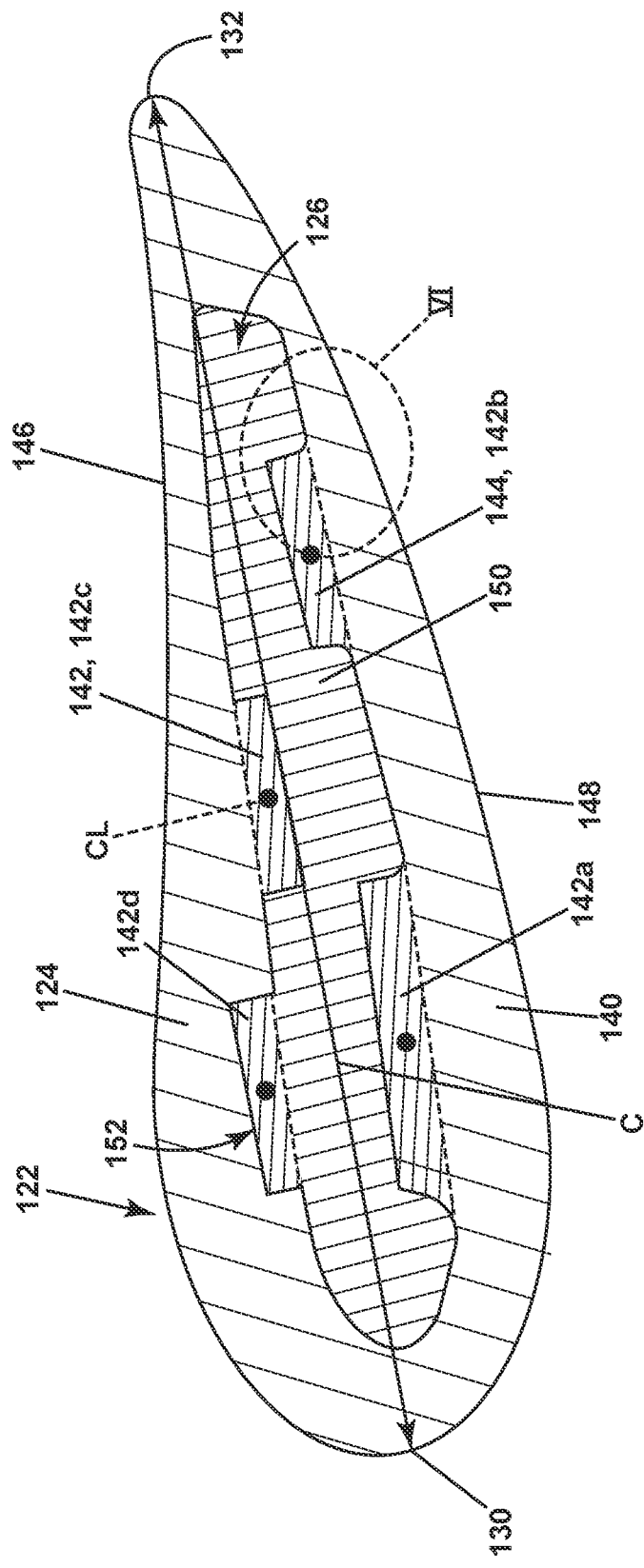
FIG. 5 is a cross-sectional view of the airfoil of FIG. 4 taken along line V-V of FIG. 4.

FIG. 5 is a cross-sectional view of the composite airfoil 122 taken along line V-V of FIG. 4. The composite airfoil 122 includes a first side 146, illustrated as a concave-shaped pressure side, and a second side 148, illustrated as a convex-shaped suction side, the first and second sides 146, 148 are joined together to define an airfoil cross-sectional shape of the composite airfoil 122. It is contemplated that the at least one laminate skin 140 is one laminate skin in a single continuous part, or multiple laminate skins defining each of the first and second sides 146, 148 joined together during manufacturing.

An airfoil core 150 fills at least a portion of the interior 126. The airfoil core 150 includes at least one pocket 152. It is further contemplated that the at least one pocket 152 is formed in the at least one laminate skin 140, the airfoil core 150, or both the at least one laminate skin 140 and the airfoil core 150 as illustrated. The at least one stiffener 142 is located in the at least one pocket 152. The airfoil core 150 can include several pockets 152, by way of non-limiting example four pockets, one facing the first side 146 and holding a third stiffener 142c, one in the airfoil core 150 and holding a fourth stiffener 142d, and two facing the second side 148 and holding the first and second stiffeners 142a, 142b. It is contemplated that one or more layers of adhesive (not shown) can also be applied between the at least one stiffener 142 and the at least one pocket 152.

Figure 6:
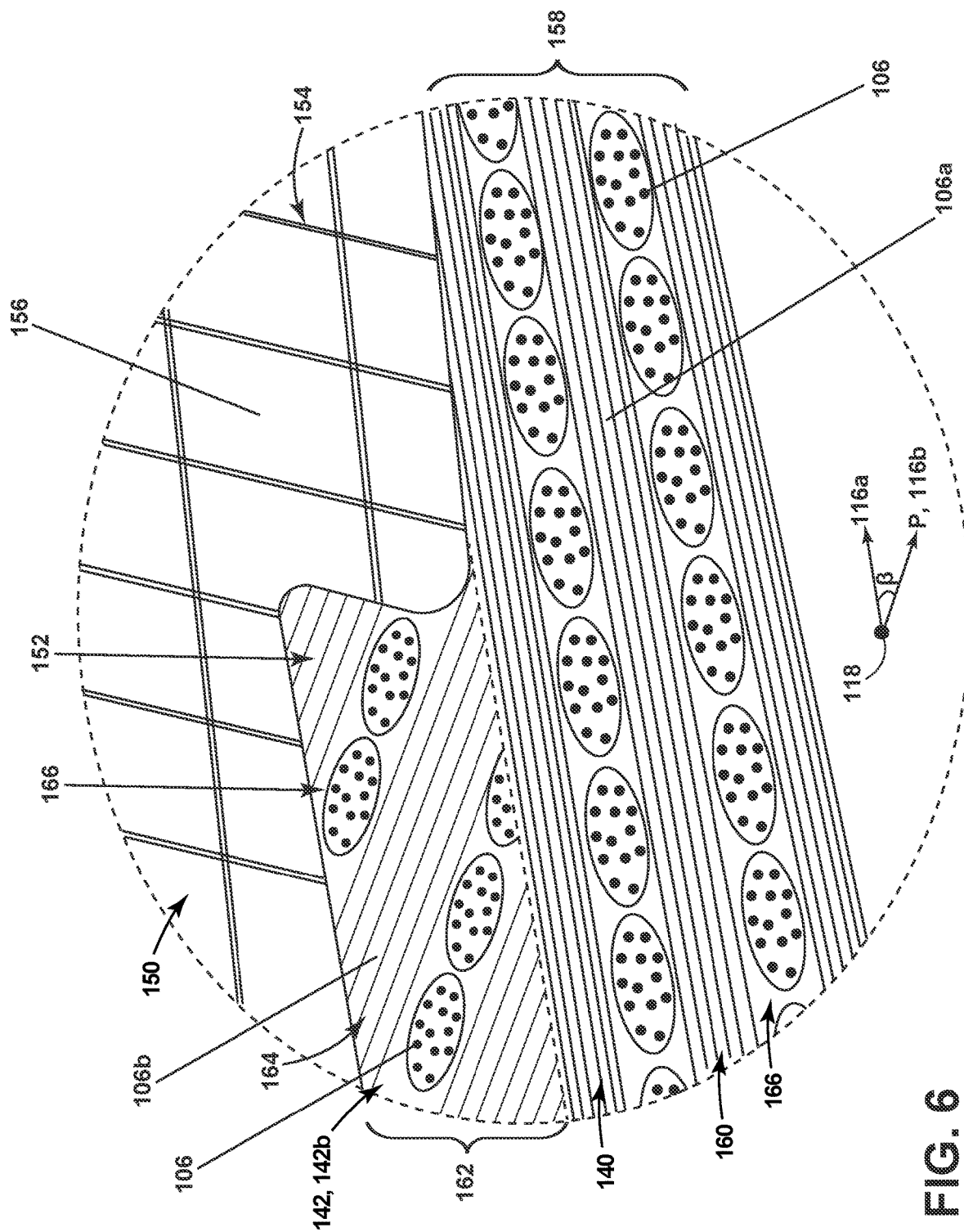
FIG. 6 is an enlarged view of a portion VI of the airfoil of FIG. 5 according to an aspect of the disclosure.

Turning to FIG. 6, an enlarged view of a portion VI of FIG. 5 of the composite airfoil 122 is illustrated. The airfoil core 150, the at least one stiffener 142, and more particularly the second stiffener 142b, and the at least one laminate skin 140 are all illustrated. The airfoil core 150 can be a composite core including a three-dimensional, woven fiber network 154. The woven fiber network 154 can be free of any polymer material between the fibers, referred to as a "dry" woven network during manufacturing. In other words, the woven network is dry during manufacturing and later injected with resin, by way of non-limiting example in an RTM process, to finalize the component. Alternatively, the airfoil core 150 can include the woven fiber network 154 in a fully cured polymer matrix 156. For instance, the airfoil core 150 can be a polymer-impregnated, three-dimensional, fiber preform.

The at least one laminate skin 140 can include a first set of stacked plies 158. The first set of stacked plies 158 includes a first type of ply 160 having directional fibers 106, or skin fibers 106a, extending in a third direction 116a. The at least one stiffener 142, and more particularly, the illustrated second stiffener 142b, can include a second set of stacked plies 162. The second set of stacked plies 162 includes a second type of ply 164 having directional fibers 106, or stiffener fibers 106b extending in a fourth direction 116b. The fourth direction 116b can be a pre-determined direction (denoted "P") corresponding with a pre-determined stiffness that is a larger stiffness amount with respect to the third direction 116a. The third direction 116a can be different than the fourth direction 116b. The third direction 116a and the fourth direction 116b can be oriented at a fiber angle (denoted "β") with respect to each other. The fiber angle β can be such that the at least one stiffener 142 is greater than or equal to 5% stiffer than the at least one laminate skin 140.

A third type of ply 166 can be stacked in the first set of stacked plies 158 and the second set of stacked plies 162. The third type of ply 166 having directional fibers 106 extending in the second direction 118 different than the third or fourth directions 116a, 116b.

It is contemplated that the material associated with the first set of stacked plies 158 has the same stiffness as the material associated with the second set of stacked plies 162. The pre-determined direction P can enhance a pre-determined stiffness for the second set of stacked plies 162 that is greater than the first set of stacked plies 158. In this manner, providing a directional change with the directional fibers 106 enables turning of the stiffness to determine a pre-determined stiffness.

Figure 7:
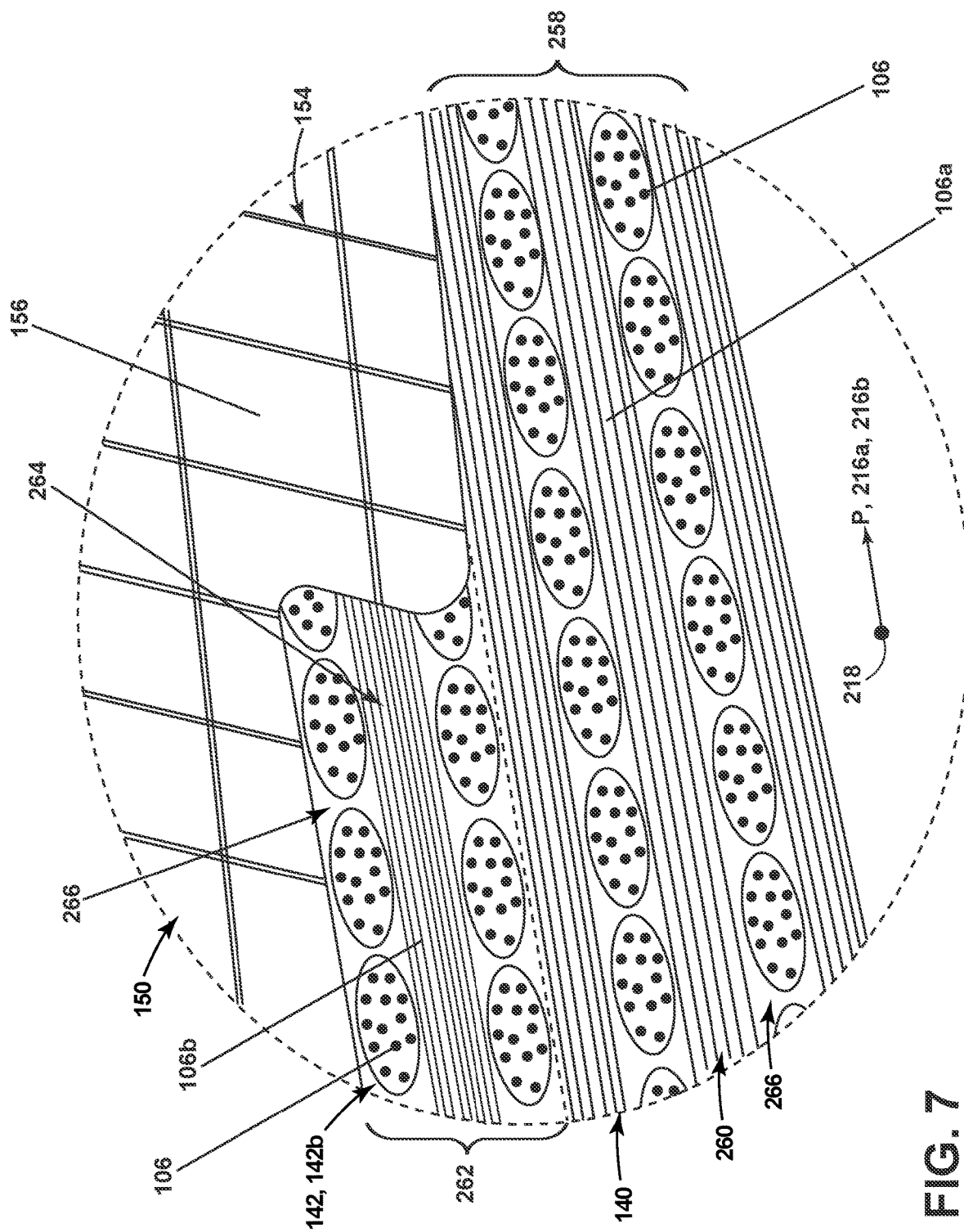
FIG. 7 is an enlarged view of the portion VI of the airfoil of FIG. 5 according to another aspect of the disclosure.

FIG. 7 is an enlarged view of the portion VI of FIG. 5 according to another aspect of the disclosure herein. The airfoil core 150, the at least one stiffener 142, and more particularly the second stiffener 142b, and the at least one laminate skin 140 are all illustrated.

The at least one laminate skin 140 can include a third set of stacked plies 258. The third set of stacked plies 258 includes a fourth type of ply 260 having directional fibers 106, or the skin fibers 106a, extending in a third direction 216a.

The at least one stiffener 142, and more particularly the second stiffener 142b, can include a fourth set of stacked plies 262. The fourth set of stacked plies 262 includes a fifth type of ply 264 having directional fibers 106, or stiffener fibers 106b extending in a fourth direction 216b. The fourth direction 216b can be a pre-determined direction P as described herein. Furthermore, the third and the fourth directions 216a. 216b can be the same direction. The fourth set of stacked plies 262 can have an increased number of the fifth type of ply 264 with stiffener fibers 106b extending in the pre-determined direction P.

A sixth type of ply 266 can be stacked in the third set of stacked plies 258 and the fourth set of stacked plies 262. The sixth type of ply 266 having directional fibers 106 extending in a fifth direction 218 different than the third and the fourth directions 216a, 216b. It is contemplated that the material associated with the third set of stacked plies 258 has a different stiffness than the material associated with the fourth set of stacked plies 262. The pre-determined direction P can determine a pre-determined stiffness for each of the third and fourth sets of plies 258, 262.

The disclosure herein refers to the addition of stiffeners to a woven core or a laminate skin of an airfoil. The at least one stiffener described herein selectively adds directional stiffness between the woven core and the laminate skin to locally bolster the stiffness. The at least one stiffener enables preferential or local stiffness to occur vs. stiffening the entire laminate skin. The at least one stiffener enables tailoring of stiffness where it is needed.

It should be appreciated that application of the disclosed design is not limited to turbine engines with fan and booster sections, but is applicable to turbojets and turbo engines as well.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A composite airfoil, comprising an airfoil core; a wall surrounding the airfoil core, including a first set of stacked plies including a first type of ply having directional fibers extending in a first direction, and defining at least a portion of an exterior surface, the exterior surface extending between a leading edge and a trailing edge to define a chordwise direction and between a root and a tip to define a spanwise direction; and at least one stiffener located between the airfoil core and the wall, the at least one stiffener having a second set of stacked plies including a second type of ply having directional fibers extending in a pre-determined direction associated with a pre-determined stiffness of the at least one stiffener; wherein the at least one stiffener is oriented relative to the spanwise direction so as to provide torsional stiffening.

The composite airfoil of any preceding clause wherein the wall comprises at least one laminate skin defined by the first set of stacked plies and having a first stiffness and the at least one stiffener comprises a laminate stiffener defined by the second set of stacked plies and having a second stiffness.

The composite airfoil of any preceding clause wherein the second stiffness is 5%, or more, stiffer than the first stiffness.

The composite airfoil of any preceding clause wherein the second set of stacked plies includes both the first type of ply and the second type of ply with a greater number of the second type of ply defining the second set of stacked plies.

The composite airfoil of any preceding clause wherein the first direction is the same as the second direction.

The composite airfoil of any preceding clause wherein the first direction is different than the second direction.

The composite airfoil of any preceding clause further comprising at least one pocket in one of the airfoil core or the at least one laminate skin, wherein the at least one stiffener is located in the at least one pocket.

The composite airfoil of any preceding clause wherein the at least one stiffener is oriented with respect to the spanwise direction at an angle of between or equal to 30 degrees and 60 degrees.

The composite airfoil of any preceding clause wherein the airfoil core is a composite core comprising a three-dimensional, woven fiber network.

The composite airfoil of any preceding clause wherein the at least one stiffener is multiple stiffeners.

An airfoil for a turbine engine, which generates a hot gas fluid flow, the airfoil comprising: a wall defining an exterior surface along which the hot gas fluid flow flows and extending between a leading edge and a trailing edge to define a chordwise direction and between a root and a tip to define a spanwise direction; a composite core surrounded by the wall; and at least one stiffener located between the composite core and the exterior surface.

The airfoil of any preceding clause further comprising at least one laminate skin defining at least a portion of the exterior surface.

The airfoil of any preceding clause wherein the at least one laminate skin is multiple laminate skins together defining the exterior surface.

The airfoil of any preceding clause wherein the at least one stiffener is oriented with respect to the spanwise direction at an angle of between or equal to 30 degrees and 60 degrees.

The airfoil of any preceding clause wherein the at least one laminate skin comprises a first set of directional fibers extending in a first direction defining a first stiffness and the at least one stiffener comprises a second set of directional fibers extending in a second direction defining a second stiffness.

The airfoil of any preceding clause wherein the second stiffness is 5%, or more, stiffer than the first stiffness.

The airfoil of any preceding clause wherein the first direction is different than the second direction.

The airfoil of any preceding clause wherein the first direction is the same as the second direction.

The airfoil of any preceding clause further comprising at least one pocket in one of the composite core or the exterior surface, wherein the at least one stiffener is located in the at least one pocket.

The airfoil of any preceding clause wherein the at least one stiffener is multiple stiffeners.

What we claim is:

1. A composite airfoil, comprising:
an airfoil core including a composite core comprising a three-dimensional, woven fiber network;
a wall completely surrounding the airfoil core, including a first set of stacked plies including a first type of ply having directional fibers extending in a first direction, and defining at least a portion of an exterior surface, the exterior surface extending between a leading edge and a trailing edge to define a chordwise direction and between a root and a tip to define a spanwise direction; and
at least one stiffener located in at least one pocket defined by the composite core and the wall, wherein the at least one stiffener is located at the at least one pocket, the at least one stiffener having a second set of stacked plies including a second type of ply having directional fibers extending in a pre-determined direction associated with a pre-determined stiffness of the at least one stiffener;
wherein the at least one stiffener is oriented relative to the spanwise direction so as to provide torsional stiffening.

2. The composite airfoil of claim 1 wherein the wall comprises at least one laminate skin defined by the first set of stacked plies and having a first stiffness and the at least one stiffener comprises a laminate stiffener defined by the second set of stacked plies and having a second stiffness.

3. The composite airfoil of claim 2 wherein the second set of stacked plies includes both the first type of ply and the second type of ply with a greater number of the second type of ply defining the second set of stacked plies.

4. The composite airfoil of claim 1 wherein the at least one stiffener is oriented with respect to the spanwise direction at an angle of between or equal to 30 degrees and 60 degrees.

5. The composite airfoil of claim 1 wherein the at least one stiffener is multiple stiffeners.

6. An airfoil for a turbine engine, which generates a hot gas fluid flow, the airfoil comprising:
a wall comprising a set of stacked plies and defining an exterior surface along which the hot gas fluid flow flows and extending between a leading edge and a trailing edge to define a chordwise direction and between a root and a tip to define a spanwise direction, the wall bounding an interior;
a composite core located within the interior and surrounded entirely by the wall;
at least one stiffener located between the composite core and the exterior surface, the at least one stiffener comprising laminate or one or more layers of plies; and
at least one pocket defined by the composite core and the wall, wherein the at least one stiffener is located at the at least one pocket.

7. The airfoil of claim 6 further comprising at least one laminate skin defining at least a portion of the exterior surface.

8. The airfoil of claim 7 wherein the at least one laminate skin is multiple laminate skins together defining the exterior surface.

9. The airfoil of claim 7 wherein the at least one stiffener is oriented with respect to the spanwise direction at an angle of between or equal to 30 degrees and 60 degrees.

10. The airfoil of claim 7 wherein the at least one laminate skin comprises a first set of directional fibers extending in a first direction defining a first stiffness and the at least one stiffener comprises a second set of directional fibers extending in a second direction defining a second stiffness.

11. The airfoil of claim 10 wherein the second stiffness is 5%, or more, stiffer than the first stiffness.

12. The airfoil of claim 10 wherein the first direction is different than the second direction.

13. The airfoil of claim 10 wherein the first direction is the same as the second direction.

14. The airfoil of claim 6 wherein the at least one stiffener is multiple stiffeners.

15. A composite airfoil, comprising:
an airfoil core;
a wall surrounding the airfoil core, the wall comprising at least one laminate skin defined by a first set of stacked plies and having a first stiffness, the first set of stacked plies including a first type of ply having directional fibers extending in a first direction, and the wall defining at least a portion of an exterior surface, the exterior surface extending between a leading edge and a trailing edge to define a chordwise direction and between a root and a tip to define a spanwise direction; and at least one stiffener located between the airfoil core and the wall, the at least one stiffener comprising a laminate stiffener defined by a second set of stacked plies and having a second stiffness, the second set of stacked plies including both the first type of ply and a second type of ply with a greater number of the second type of ply defining the second set of stacked plies, and the second type of ply having directional fibers extending in a pre-determined direction associated with a pre-determined stiffness of the at least one stiffener;

wherein the at least one stiffener is oriented relative to the spanwise direction so as to provide torsional stiffening.

16. The composite airfoil of claim 15 wherein the second stiffness is 5%, or more, stiffer than the first stiffness.

17. The composite airfoil of claim 15 wherein the first direction is the same as the pre-determined direction.

18. The composite airfoil of claim 15 wherein the first direction is different than the pre-determined direction.

19. The composite airfoil of claim 15, further comprising at least one pocket in one of the airfoil core or the at least one laminate skin, wherein the at least one stiffener is located in the at least one pocket.

20. The composite airfoil of claim 15 wherein the at least one stiffener is multiple stiffeners.

* * * * *